UNITED STATES PATENT OFFICE.

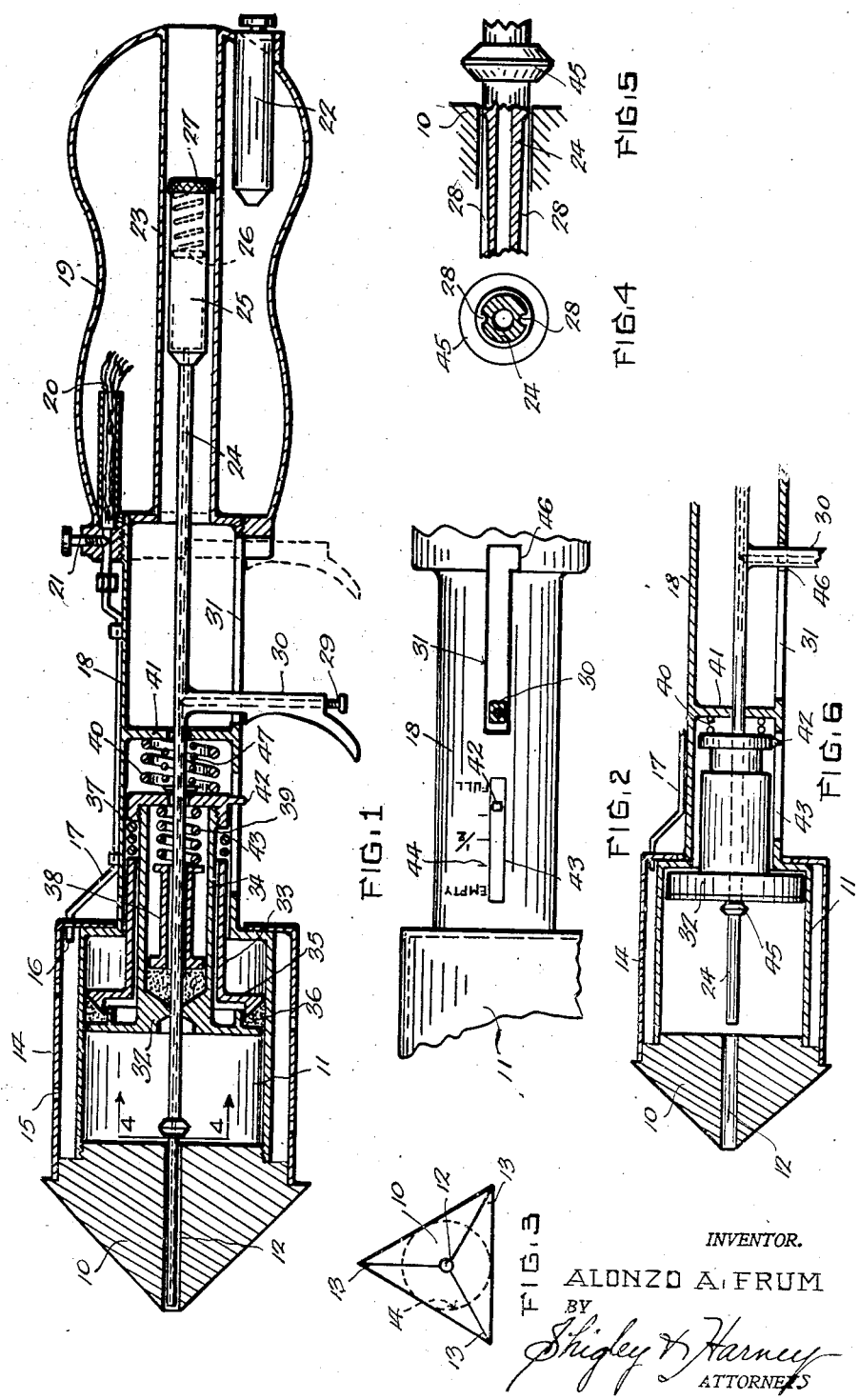

ALONZO A. FRUM, OF COLUMBUS, OHIO.

SOLDERING-IRON.

1,400,148.  Specification of Letters Patent.  Patented Dec. 13, 1921.

Application filed January 28, 1921. Serial No. 440,669.

*To all whom it may concern:*

Be it known that I, ALONZO A. FRUM, a citizen of the United States of America, residing at Columbus, in the county of Franklin and State of Ohio, have invented certain new and useful Improvements in Soldering-Irons, of which the following is a specification.

My present invention relates generally to soldering irons, and more particularly to a fountain soldering iron, my object being the provision of a device of this character adapted among other things to the feeding of molten solder as well as a fluid flux under pressure so as to render the iron particularly effective in soldering overhead fixtures and the like where the iron is held in a vertical or substantially vertical position, especially in close quarters.

Still further objects residing more or less in the details of construction and arrangement of the various parts constituting my improved soldering iron will be apparent from the accompanying drawing, which forms a part of this specification, and in which, Figure 1 is a longitudinal section through my improved iron complete, Fig. 2 is a side elevation of a portion thereof, Fig. 3 is a front elevation, Fig. 4 is a detail cross section taken on line 4—4 of Fig. 1, Fig. 5 is a sectional side view of a portion of the valve stem and the adjacent portion of the head or bit, and Fig. 6 is a sectional side view of a portion of the iron showing the plunger retracted for filling purposes.

Referring now to these figures, the head or bit 10 of my improved soldering iron is connected to one end of the fountain or feed cylinder 11 and is provided with an axial bore 12 opening at one end through the apex of the head and at its opposite end into the forward end of the cylinder 11. The head or bit 10 is preferably of the pyramidal form particularly shown in Fig. 3, with three sides instead of the usual four sides, adapting the bit to work into small spaces inaccessible to the usual construction, and it will be noted that the base of the head presents three extensions 13 beyond the cylinder 11 and also beyond an outer casing 14 around the cylinder, so that these extensions 13 can be used on ledges or flanges which face upwardly in close quarters permitting use of the iron as a whole in a vertical position only.

The casing 14 which is spaced from the cylinder 11, is apertured as at 15, and has projecting forwardly therein a burner 16 in communication with the forward end of a gas pipe 17 so that combustion may be thus set up in the space between the casing and cylinder for maintaining the solder in a molten state within the cylinder and also maintaining proper temperature of the bit 10.

The rear end of the cylinder 11 opens into a cylindrical barrel 18 along which the gas feed pipe 17 extends, and this barrel has a hollow handle 19 at its rear end forming a gasolene chamber from which gasolene is fed under pressure to the feed pipe 17 through a wick 20 and a manually controlled and adjustable feed valve 21.

The hollow handle 19 has an air pump 22 and is provided with an axial tube 23 extending therethrough and forming a cylindrical channel therein for the rear end of the valve stem 24 and the rear enlarged flux holding receptacle 25 of this valve stem having a forwardly moving spring pressed plunger 26 detachably held therein by a cap 27.

The stem 24 projects axially through the barrel 18 and cylinder 11 and its forward end projects into the axial bore 12 of the bit 10, its forward portion having lengthwise peripheral feed grooves 28 particularly shown in Figs. 4 and 5 which, when the valve stem is shifted rearwardly, admit of the feed of molten solder from the interior of the cylinder 11 into the bore of the bit. The valve stem is also hollow for the passage of flux from the flux holder 25, this feed of flux being under control of a valve whose manually adjustable stem 29 is threaded through an angularly disposed handle 30 of the valve stem projecting laterally and exteriorly through a longitudinal slot 31 of the barrel 18.

In the cylinder 11 is a solder feeding plunger 32 preferably formed of two parts, one of which has a cylindrical portion 33 surmounting a cylindrical portion 34 of the other part and provided with a head 35 opposing the head of the other part so as to adjustably compress packing 36 between the heads under tension of a spring 37. Packing is also disposed within the inner part of the plunger around the valve stem 24 and adjustably compressed by a member 38 under control of a spring 39, the rear end of the plunger as a whole being engaged by a spring 40 compressed between the same and a transverse wall 41 intermediate the ends of the barrel 18 so as to force the plunger forwardly in the cylinder for feeding purposes, the rear end of the plunger having a laterally projecting pin 42 extending externally through a lengthwise slot 43 of the barrel 18 as shown in Fig. 2 and forming an indicator in conjunction with the graduations 44 along the external surface of the barrel adjacent to slot 43.

In addition to the bit 10, the valve stem 24 has a collar or enlargement 45 shiftable upon rearward movement of the valve stem, into engagement with the plunger 32 so that the latter may be moved rearwardly in this way to the rearmost portion of the cylinder 11 as the forward portion of the plunger is withdrawn rearwardly from the bit in order that solder of granular or other form may be fed into the cylinder 11 through the bore 12 of the bit. This filling position of the parts is shown in Fig. 6 and it will be noted from Fig. 2 in particular that the barrel 18 has an annular slot 46 at the rear end of its slot 31 in which the handle 30 of the valve stem works so that when this handle is shifted rearwardly to the position of Fig. 6, slight angular movement of the handle will serve to shift the same into the angular slot 46 whereby the several parts may be held against the spring tension while filling the solder holding cylinder.

In use, the heating means are controlled and actuated similar to the usual blow torch and when the iron is properly heated slight rearward movement of the handle 30 serves to shift the rear end of the valve stem channels 28 into the forward portion of the cylinder 11 so as to permit of feed of the solder through the bore of the bit. Previous to this flux may be fed from the flux holder 25 by simply rotating the valve stem 29 in the handle 30, and it becomes quite obvious that considerable advantage is obtained by virtue of the readily controlled feed of solder under pressure of the spring actuated plunger 32 especially in close quarters where there is little more than room for the solder iron itself and insufficient room for the manipulation of a soldering iron in one hand and a bar of solder in the other hand. My invention promotes uniformity and speed in the soldering operation and provides a construction which is not only simple and economical, but will be strong and durable.

The valve stem 24 is in operation normally under control of the spring 47 which tends to shift the same to the forward position cutting off the feed of solder and against the tension of which spring the valve stem is manually shiftable either to a slight degree in a rearward direction permitting feed of solder or to the position of Fig. 6 for forcing the plunger to retracted position.

The forward end of the valve stem 24 may be made to extend slightly beyond the head or bit 10 when the feed controlling valve is closed, so that as the head or bit is pressed against the work in use, the stem will be shifted rearwardly and the valve slightly opened, thus providing for automatic feed of solder if this is desired.

I claim:

1. A soldering iron including a bit having a bore, a cylinder adjacent to the bit with which the bore communicates, a spring pressed plunger in the cylinder, means for heating the cylinder and bit, and a valve stem having a handle and having its forward portion extending into the bore of the bit and provided with grooves in its surface and also having a valve piece rearwardly of its grooved portion engageable with the bit around the rear end of its bore.

2. A device of the character described including a bit having a bore, a cylinder attached to the bit and in communication with the bore, a spring actuated plunger in the cylinder, and a manually controlled valve stem having one end disposed in the bore of the bit and provided with surface grooves controlling communication from the cylinder to the bore of the bit, said valve stem having a valve member engageable with the bit to close its bore and also engageable with the plunger for shifting the latter against the tension of its spring.

3. A fountain soldering iron having a bit provided with a bore, solder holding and feeding means adjacent to the bit and in communication with the bore, means for heating the solder holding means and the bit, and a hollow valve stem controlling the feed of solder to the bore of the bit, having flux holding means in communication with the hollow thereof and means for controlling feed of flux through the valve stem.

4. A fountain soldering iron having a bit provided with a bore, a solder holding cylinder connected to the bit and in communication with the bore, a spring pressed plunger in the said cylinder, means for heating the cylinder and the bit, and a lengthwise shiftable valve stem extending axially through the cylinder and controlling feed of solder from the cylinder to the bore of the bit, having means engageable with the plunger to retract the latter against the tension of its spring and permit of filling the cylinder through the bore of the bit.

5. A fountain soldering iron having a bit provided with a bore, a solder holding cylinder connected to the bit and in communication with the bore, a spring pressed plunger in the said cylinder, means for heating the cylinder and the bit, and a lengthwise shiftable valve stem extending axially through the cylinder and controlling feed of solder from the cylinder to the bore of the bit, having means engageable with the plunger to retract the latter against the tension of its spring and permit of filling the cylinder through the bore of the bit, said plunger having at its rear portion an exteriorly projecting indicator for the purpose described.

6. A fountain soldering iron including a bit having a bore, a cylinder attached to the bit and in communication with the bore, a spring pressed plunger in the cylinder, a barrel extending from the cylinder, a lengthwise shiftable valve stem controlling the feed of solder from the cylinder to the bore of the bit, having a portion thereof engageable with the plunger to retract the latter against tension of its spring, and a controlling handle on the valve stem projecting outwardly through the barrel.

7. A fountain soldering iron including a bit having a bore, a cylinder attached to the bit and in communication with the bore, a spring pressed plunger in the cylinder, a barrel extending from the cylinder, a lengthwise shiftable valve stem controlling the feed of solder from the cylinder to the bore of the bit, having a portion thereof engageable with the plunger to retract the latter against tension of its spring, a handle projecting laterally from the valve stem, said barrel having a lengthwise slot in which the handle is movable provided with an angular extension at its rear end in which the handle is shiftable to hold the plunger in retracted position while filling the cylinder through the bore of the bit.

In testimony whereof I have affixed my signature.

ALONZO A. FRUM.